3,021,483
MEASURING INSTRUMENT
Arthur F. Spero, Columbus, Ohio, assignor to Industrial
Nucleonics Corporation, a corporation of Ohio
Filed Oct. 27, 1958, Ser. No. 769,902
3 Claims. (Cl. 324—131)

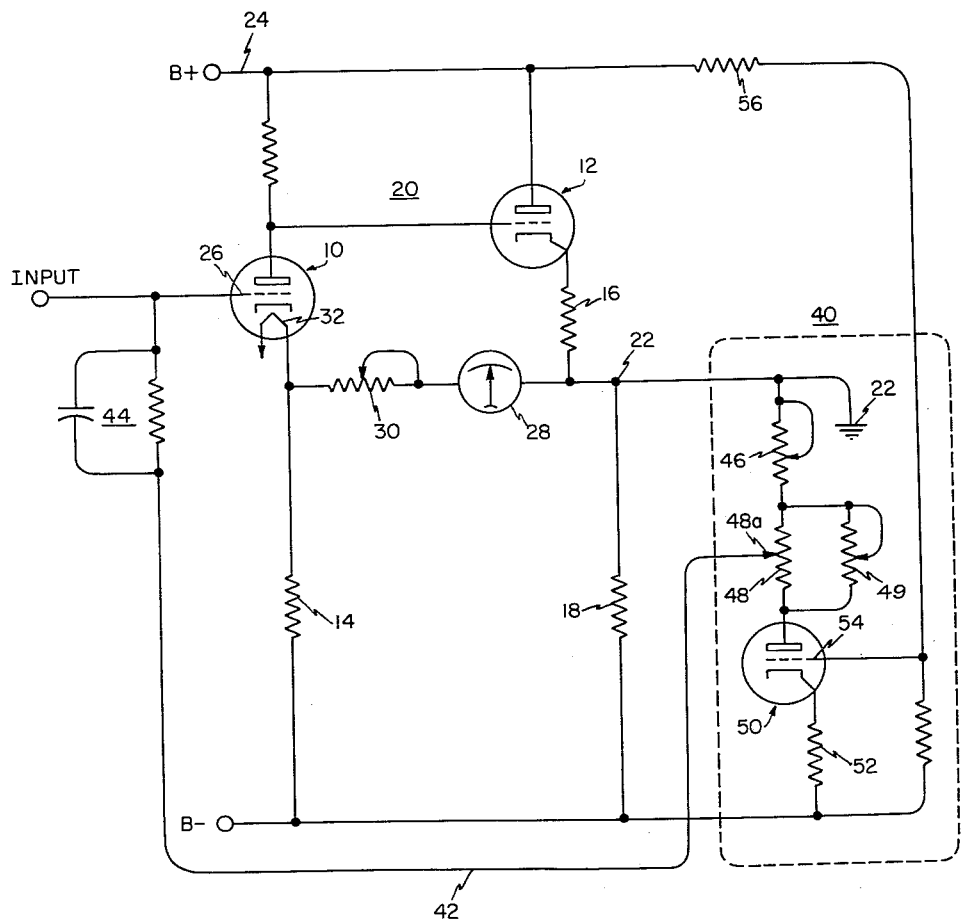

This invention relates generally to measuring instruments and more particularly to instruments of the expanded scale type for measuring electrical potentials and currents.

In many instances, the measurement of a potential or a current is desired between certain limits, such limits being well above zero. In such cases, the standard type meter is unsatisfactory since the indicator deflection within the desired limits cannot always be read with the required degree of accuracy. The need arises, therefore, for an instrument whereby changes in potential or current relative to a given reference level may be measured with high accuracy. Such instruments are well known in the art and are commonly referred to as expanded scale meters. These instruments and their accompanying circuitry expand the scale within the desired limits so that a high degree of accuracy may be obtained in the reading of the meter.

Expanded scale meters of the type known in the art require the use of a separate power supply other than the source which is being measured. This power is normally supplied by batteries and furnishes the basic reference quantity for the meter. The use of a separate power supply necessitates a relatively complex method of adjusting the level point about which the scale is expanded, thus limiting the instrument's utility. Typically, such systems are complex and more particularly are not as readily variable as is desirable to facilitate easy adjustment and simple operation.

Accordingly, an object of the invention is to provide a new and improved measuring circuit for an expanded scale meter.

It is a further object of this invention to provide a method and means for expanding the scale of a feedback type electrometer amplifier wherein the entire unit is operated from a single power source.

It is a still further object of this invention to provide a method and means for expanding the scale of a feedback type electrometer amplifier over any range without affecting the input impedance of the amplifier.

Other and further objects will appear from the following specification in conjunction with the accompanying drawing wherein the single figure shows a simplified measuring circuit utilizing the present invention.

With reference to the single figure, there is shown an electrometer amplifier 20 having a measuring bridge network comprising a triode 10, triode 12 and associated circuitry. A resistor 14 is inserted in series with the cathode 32 of triode 10 and the combination is connected to an operating potential existing between B— and a line 24. Input signals may be impressed between the grid electrode 26 of triode 10 and ground 22. In addition, a degenerative feedback potential may be applied to grid 26 of triode 10 through a resistor-capacitor parallel combination 44 which is coupled to a constant current circuit 40 by means of line 42.

Triode 10 is direct coupled to triode 12 by having a resistor 18 connected between B— and the cathode resistor 16 of tube 12. The common junction of these two resistors 16 and 18 is grounded at 22. An output indicating meter 28 is serially connected with a sensitivity adjusting potentiometer 30 between the cathode 32 of triode 10 and ground 22.

Inasmuch as any electronic scale expansion device requires means for balancing out the signal level above which said expansion occurs, the constant current circuit 40 accomplishes this function without the necessity for an additional external source of potential. Circuit 40 comprises a voltage divider disposed between ground and B— which includes, in serial connection, a potentiometer 46, a parallel combination of a potentiometer 48 and a potentiometer 49, a triode 50 and a cathode resistor 52 for said triode. Line 42 terminates in a variable tap 48a of potentiometer 48 and grid 54 of tube 50 is returned to a source of substantially constant positive potential via resistor 56.

The current through circuit 40 is determined by the fixed potential on the grid 54 of triode 50 with respect to B— and the resistive value of resistor 52. For tubes having a relatively high amplification factor and with a given grid potential substantially larger than the grid-cathode bias required for a given current, the current through the tube 50 will approach the value of $$\frac{E_g}{R_k}$$

wherein $E_g$ is the grid voltage of triode 50 with respect to B— and where $R_k$ is the ohmic resistance value of the cathode resistor 52. This fact is easily derived from the well known equation for the voltage gain $A_f$ of a typical cathode follower. In E. M. Boone's "Circuit Theory of Electron Devices," Equation (3–78) on page 133, is one form of this equation; it is as follows:

(1a) $$A_f = \frac{\mu R_k}{r_p + (\mu+1)R_k}$$

where:
$r_p$ = A.-C. plate resistance
$\mu$ = amplification factor
$R_k$ = cathode resistor This equation, in the case of constant current circuit 40, becomes (1b) $$A_f = \frac{\mu R_{52}}{r_p + (\mu+1)R_{52} + R_{46} + \frac{R_{48}R_{49}}{R_{48}+R_{49}}}$$

due to potentiometers 46, 48 and 49 in the plate circuit. Here, the subscript numbers refer to those potentiometers or resistors in the drawing having corresponding reference numerals.

Moreover, the voltage gain $A_f$ is also defined as $$A_f = e_0/e_1$$

and the output voltage of a cathode follower as $$e_0 = i_b R_k \equiv i_b R_{52}$$

By substitution, then, equation 1a above becomes (2) $$i_b = \frac{\mu e_i}{r_p + (\mu+1)R_{52} + R_{46} + \frac{R_{48}R_{49}}{R_{48}+R_{49}}}$$

(2a) $$i_b = \frac{e_i}{\frac{r_p}{\mu} + \left(1+\frac{1}{\mu}\right)R_{52} + \frac{R_{46}}{\mu} + \frac{1}{\mu}\left[\frac{R_{48}R_{49}}{R_{48}+R_{49}}\right]}$$

By restricting tube 50 to those having relatively large amplification factors $\mu$, equation 2a reduces to (2b) $$i_b = \frac{e_i}{R_{52}}$$

By choosing a grid potential $e_g$ very much larger than the grid-cathode bias $e_c$, Equation 2b becomes (2c) $$i_b = \frac{e_g}{R_k}$$

Therefore, the current through circuit 40 can be maintained substantially constant and equal to $e_g/R_k$ by the proper choice of circuit parameters. If this current remains constant, the respective voltage drops across potentiometers 46 and 48 are proportional to their individual resistances. In this manner, the potential on line 42 with respect to ground may be widely varied to accomplish zeroing and suppression functions.

For dynamic changes of potential at ground or point 22 as would be caused by input signals, only slight attenuation occurs between point 22 and line 42. This is true since the current through circuit 40 is determined by fixed elements as described; hence, the dynamic plate impedance of tube 50 is greatly amplified becoming $r_p + uR_k$.

The attenuation is $$\frac{r_p + (1+u)R_k}{r_p + (1+u)R_k + RL_1 + \frac{RL_2 RL_3}{RL_2 + RL_3}}$$

wherein $r_p$ is the A.-C. plate resistance of triode 50, $u$ is the amplification factor of triode 50, and $RL_1$, $RL_2$ and $RL_3$ are respectively equivalent to the effective resistances of potentiometers 46, 48 and 49 and $R_k$ is the cathode resistor 52 of triode 50.

Any mathematical function which correctly describes the effect of the physical device on information transferred through it may be called a "transfer function." Such a transfer function, hereinafter signified by KG, can conveniently be expressed as a ratio, all of which leads to one specific way of interpreting, for example, the preceding Equation 1b which, for convenience, is repeated below.

$$KG = A_f = \frac{\mu R_{52}}{r_p + (\mu+1)R_{52} + R_{46} + \frac{R_{48}R_{49}}{R_{48}+R_{49}}}$$

This equation is in the form of a dimensionless ratio; as such, it represents the transfer function of, for example, a voltage divider network comprising each of the series connected resistance elements $r_p$, $R_{52}$, $\mu R_{52}$, $R_{46}$, $R_{48}$, and $R_{49}$, as enumerated in the denominator. Accordingly, only that portion of the total signal applied to such a network as is developed across the resistive element $\mu R_{52}$ is available at the output of such a divider network. Hence, it is said that the input signal is attenuated and precisely by an amount as shown in Equation 1b. Similarly, if the signal developed across the resistance elements $r_p$, $R_{52}$ and $\mu R_{52}$ were the one of interest, then, in this instance, the attenuation, or the transfer function, becomes:

(3a) $$KG = \frac{r_p + (\mu+1)R_{52}}{r_p + (\mu+1)R_{52} + R_{46} + \frac{R_{48}R_{49}}{R_{48}+R_{49}}}$$

Upon setting variable tap 48a at the junction of potentiometer 49 and tube 50, Equation 3a represents the maximum amount of attenuation which will be detected at variable tap 48a for a given signal applied at point 22. The relative value of Equation 3a becomes rather apparent through simplification, thusly:

(3b) $$KG = \frac{1}{1 + \frac{R_{46} + \frac{R_{48}R_{49}}{R_{48}+R_{49}}}{r_p + (\mu+1)R_{52}}}$$

It will be noted that the second term in the denominator of Equation 3b approaches zero for large values of $\mu$, which, it was previously pointed out, was a requirement to be satisfied in the choice of the particular tube 50. Therefore, the quantitative value of Equation 3b approaches unity as a limit and can be readily adjusted to any desired value near unity again by the proper choice of circuit parameters.

Similarly, with variable tap 48a at the junction of potentiometers 46 and 48, Equation 3b becomes (3c) $$KG = \frac{1}{1 + \frac{R_{46}}{r_p + (\mu+1)R_{52} + \frac{R_{48}R_{49}}{R_{48}+R_{49}}}}$$

which, quantitatively, is always greater than Equation 3b and yet always less than unity for $R_{46}$ greater than zero.

It should be understood that variations in the input signal at the grid electrode 26 of triode 10 produce corresponding changes in potential at point 22, and these in turn are fed back to triode 10 attenuated a very small but, more important, substantially constant amount regardless of the existing position of variable tap 48a of potentiometer 48. It should also be understood that the specific position of variable tap 48a determines the extent to which the zero reference of the input signal at grid 26 of triode 10 is suppressed. Zero suppression is more of a static rather than dynamic condition and is determined by the set-up current through tube 50 which produces the particular voltage drop across potentiometers 46 and 48. It is in the variations of the input signal only to which reference is made whenever the circuit operation is described as a dynamic one. Without the benefit of this invention, as would be the case if a conventional voltage divider circuit were used in lieu of the constant current circuit 40, the signals fed back to triode 10 would be attenuated by the same factor with which the zero reference level is shifted. Under these latter conditions, the scale expansion would be dependent upon the extent to which the zero level is shifted and therefore would be inaccurate. With the present invention, the scale expansion is constant and independent of the particular setting of potentiometer 48.

In the operation of circuit 40, with the adjustable tap 48a at the junction of potentiometer 46 and potentiometer 48, potentiometer 46 is adjusted to produce a zero output indication for zero input. Then, with the tap of potentiometer 48 at the junction of potentiometer 48 and the anode of tube 50, potentiometer 49 is adjusted so the output reads the maximum desired suppression. When an input is applied requiring a suppression equal to or less than the voltage provided by the preselected resistance of potentiometer 49, there will be a setting of potentiometer 48 which will bring the output to zero. Variations about this value are presented at the output meter on an expanded scale. If a positive-going pulse is applied to the grid 26, current flows in the triode 10 thereby raising the potential of the cathode. The anode potential of triode 10 drops to reduce current flow in triode 12. The cathode potential of triode 12 drops. The difference of potential established across the meter results in a current flow through the meter. The percent of full-scale deflection of the meter 28 will depend on how much the input signal swings above the potential at tap 48a with respect to ground. If the arm is positioned at the midpoint of the resistance 48 and an input signal of fifty volts is applied to the grid 26, the meter may read full-scale. By moving the tap 48a toward the anode of triode 50 the same input signal will cause only partial deflection of the meter 28, i.e., the scale is effectively expanded. The slight variations of potential across the constant current source 40 is not reflected in the feedback voltage on line 42, since a constant current always flows through the same resistance.

The range over which scale expansion is possible and the size of the small fixed attenuation to variational input signals is a matter of choice of design parameters. Further, the constant current circuit 40 described hereinabove may be utilized with any type amplifier and it could, for example, be transistorized or constructed of magnetic circuit components.

The foregoing example, therefore, is intended to be

What is claimed is:

1. A voltmeter for measuring the potential of an electrical signal relative to a predetermined level comprising an amplifier having a pair of input terminals to receive said signal and a pair of output terminals for providing an output voltage in response to the potential difference between said input terminals, a resistive network, an electron discharge device having anode, cathode, and grid electrodes, means for serially connecting said anode and cathode electrodes with said resistive network, means for connecting a source of D.C. potential across said series connection, means connected to said grid electrode for biasing said electron discharge device to provide a constant current through said resistive network, adjustable tap means connected to said resistive network for providing a feedback voltage having a magnitude in accordance with said predetermined level, means for connecting said feedback voltage in series opposition to said voltage to be measured, means for connecting said series-opposed voltages across said pair of input terminals, and means connected across said pair of output terminals for indicating the value of said output voltage.

2. The voltmeter as set forth in claim 1 which further includes adjustable means connected to said resistive network for changing the span of available feedback voltage.

3. The voltmeter as set forth in claim 1 in which said electrton discharge device comprises a triode having a large amplification factor.

References Cited in the file of this patent

UNITED STATES PATENTS

| 2,046,237 | Bellantine | June 30, 1936 |
| 2,434,297 | Test | Jan. 13, 1948 |
| 2,715,209 | Williams | Aug. 9, 1955 |
| 2,802,181 | Gorski | Aug. 6, 1957 |

FOREIGN PATENTS

| 481,518 | Great Britain | Mar. 11, 1938 |